April 12, 1949.   D. T. STREET   2,467,343
ROTATABLE LENS CELL FOR TRIAL FRAMES
Filed June 24, 1946
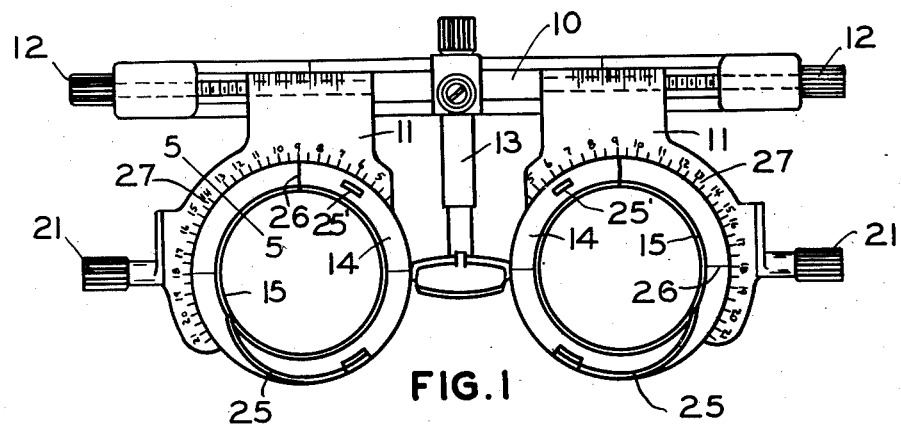
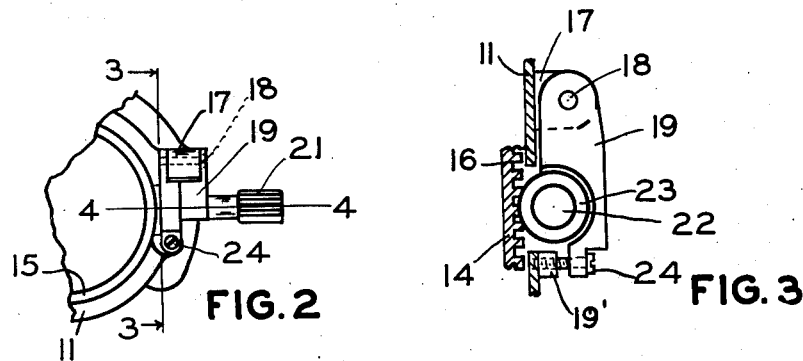
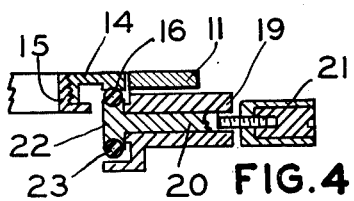
DONALD T. STREET
Inventor
Attorney Patented Apr. 12, 1949

2,467,343

UNITED STATES PATENT OFFICE 2,467,343

ROTATABLE LENS CELL FOR TRIAL FRAMES

Donald T. Street, Rochester, N. Y., assignor to Bausch & Lomb Optical Company, Rochester, N. Y., a corporation of New York Application June 24, 1946, Serial No. 678,903

2 Claims. (Cl. 88—20)

This invention relates to ophthalmic instruments and more particularly it has reference to trial frames which are used for holding test lenses and the like before the eyes of a patient.

In such types of test frames, it is necessary that means be provided for rotatably positioning the test lenses in order to selectively locate the axis of a cylindrical lens before the eye of the patient. While trial frames of the prior art have embodied such means for rotatably mounting the lenses, they have not been entirely satisfactory because of the relatively complicated expensive structure which was provided in order to accurately hold and lock the lens in adjusted position. While some of the prior art trial frames embody a simple device for rotating the lens, it is not possible for such devices to hold the lens accurately in adjusted position. The use of gears in some types of adjusting devices of the prior art also introduced errors and defective operation due to backlash.

It is an object of the present invention to overcome these difficulties and provide a trial frame which embodies means for rotatably adjusting the lens and holding it in adjusted position which will be efficient in operation yet simple in structure. Another object is to provide a trial frame embodying friction means for rotatably adjusting and holding the lens in adjusted position. These and other objects and advantages reside in certain novel features of construction, arrangement, and combination of parts as will hereinafter be more fully described and pointed out in the appended claims.

Referring to the drawings:

Fig. 1 is a front view of a trial frame embodying my invention.

Fig. 2 is a fragmentary rear view of the lens supporting arm.

Fig. 3 is a view taken on line 3—3 of Fig. 2 looking in the direction of the arrows.

Fig. 4 is a sectional view taken on line 4—4 of Fig. 2.

Fig. 5 is a sectional view taken on line 5—5 of Fig. 1.

A preferred embodiment of my invention is disclosed in the drawings wherein 10 indicates a horizontal supporting member on which a pair of downwardly depending arms 11 are slidably mounted and adapted to be laterally adjusted by rotation of the screws 12 in order to adjust the frame for different interpupillary distances. A suitable nose bridge means 13 is provided intermediate the arms 11 and the frame is adapted to be held on the face of the patient by suitable temples, not shown.

The supporting arm 11 has a circular opening within which is rotatably mounted a lens holding ring 14 which is retained in the opening by means of the threaded locking ring 15. The rear surface of ring 14 is provided with serrations or notches 16 which extend around the outer periphery of the ring. The rear face of supporting arm 11 carries a rearwardly extending lug 17 on which is pivotally mounted, by means of pin 18, the bearing member 19. Rotatably mounted on bearing member 19 is a shaft 20 having the knurled knob 21 threadedly secured to its outer end while the inner end of the shaft 20 carries disk 22 provided with a peripheral groove in which is mounted a friction element 23 comprising a ring formed of rubber or the like. The lower end of bearing member 19 carries a screw 24 which is threaded into a lug 19' on arm 11 whereby the member 19 is moved so that the friction element 23 may be adjustably urged into contact with the serrations 16 carried by the lens ring 14, as shown in Fig. 3.

The front surface of lens ring 14 is provided with suitable spring fingers 25 and studs 25' adapted to releasably hold test lenses on the rotatable ring 14 in a manner well understood by those skilled in the art. The lens carrying ring 14 may thereby be rotatably adjusted by turning knob 21 in order to bring the index lines 26 into selected relation with the circular scale 27 carried on the front face of arm 11.

From the foregoing, it will be apparent that I am able to attain the objects of my invention and provide a trial frame having improved means for rotatably adjusting the test lenses. The frictional engagement between the yieldable frictional element 23 and the serrations 16 can be readily adjusted by merely turning the screw 24. In this manner, I am able to provide a smoothly operating adjusting means which does not embody gear teeth which are difficult to form accurately and since gear teeth are eliminated, the matter of backlash is also obviated. Due to my improved construction, the lens holding ring 14 may be rotatably adjusted and held in adjusted position without need for additional locking means as is often provided in the prior art devices. I have, therefore, provided means for rotatably adjusting the lens which is not only more efficient and smoother in operation, but is also relatively simple in construction. Should the friction element 23 deteriorate through long use, it may be readily removed and replaced with a new element by merely loosening the screw 24 and swinging the bearing member 19 away from the rear face of arm 11 in order to afford convenient access to the parts. Various modifications can obviously be made in my device without departing from the spirit of my invention as pointed out in the appended claims.

I claim:

1. In a trial frame for holding test lenses before the eyes, the combination of a support, a lens holding ring rotatably mounted on the support, a bearing member pivotally mounted on said support, a shaft rotatably mounted on the bearing member, a resilient friction element carried by the shaft, said member being adapted for movement to bring the friction element into engagement with the peripheral portion of said ring, and a screw operatively engaging the member and threaded into the support for holding the element in contact with the ring and adjustably varying the frictional engagement therebetween.

2. In a frame for holding test lenses before the eyes, the combination of a support, a lens holding ring rotatably mounted on the support, a rotatable shaft, a friction element carried by the shaft, said element being in engagement with said lens holding ring whereby rotation of the shaft will rotate said ring, said shaft being pivotally mounted on the support for motion towards and from the ring and means for moving said shaft whereby the frictional engagement between the ring and the element may be adjusted.

DONALD T. STREET.

REFERENCES CITED

The following references are of record in the file of this patent:

UNITED STATES PATENTS

| Number | Name | Date |
|---|---|---|
| 47,860 | Richards | May 23, 1865 |
| 541,484 | Hempler | June 25, 1895 |
| 683,573 | Pasquarelli | Oct. 1, 1901 |
| 933,801 | Verbeck | Sept. 14, 1909 |
| 1,293,450 | Ibershoff | Feb. 4, 1919 |